Jan. 9, 1940.　　　E. J. NACHTWEY　　　2,186,264
HYDRAULIC BRAKE
Filed Aug. 23, 1937　　　2 Sheets-Sheet 2

Inventor

EDWARD J. NACHTWEY.

By Nelson Moore
Attorney

Patented Jan. 9, 1940

2,186,264

UNITED STATES PATENT OFFICE 2,186,264

HYDRAULIC BRAKE

Edward J. Nachtwey, Green Bay, Wis.

Application August 23, 1937, Serial No. 160,539

9 Claims. (Cl. 188—79.5)

The present invention concerns improvements in hydraulic brakes. It is broadly the object of this invention to provide uniform action of all the brakes of a vehicle and to allow for any variation in the quality of the separate linings.

It is an object of the present invention to eliminate manual adjustment of the brake shoes with respect to the spacing from the brake drum.

It is an object of the present invention to provide means whereby the travel or movement of the brake lever or foot pedal which the operator uses to actuate the brakes is always the same regardless of the condition of adjustment of the brakes or the state of wear of the individual linings. By use of the present structure a certain position of the pedal will cause a definite braking action, regardless of the adjustment of the brakes or the state of wear of the linings, thus eliminating a tight pedal when the brakes are new and a loose pedal when the linings are somewhat worn.

It is an object of the invention to provide means whereby a one piece shoe may be successfully used in that the structure controls the position of intermediate portions of the shoe.

It is an object of the invention to provide a one piece shoe of springy material with adequate reinforcement properly placed in such a manner so as not to interfere with the action of the shoe.

It is an object of the invention to provide a novel adjusting means whereby the position of the shoe can be continuously positioned properly with respect to the drum.

In the drawings.

In the drawings like numbers refer to like parts.

Figure 1:
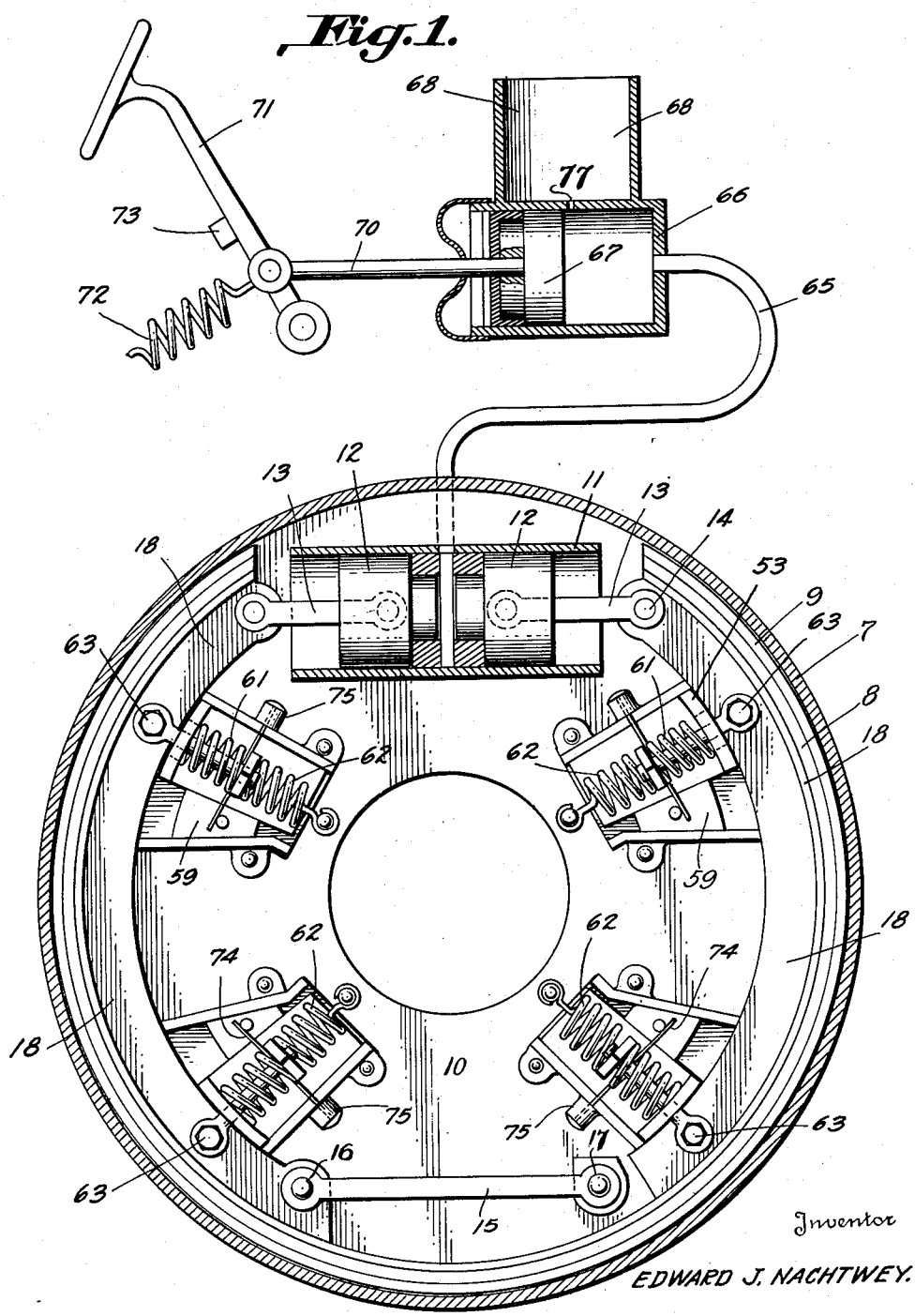
Fig. 1 shows a plan view of the brake drum with the adjusting means in place.

The structure thought to best disclose the invention has been illustrated and consists of a conventional motor vehicle wheel 6 having an annular brake surface or drum 7. Upon brake shoe 8 is mounted lining 9. All are carried by back plate 10. An hydraulic cylinder 11 for actuating the brake shoe 8 is located between the upper ends of the shoe as shown in Fig. 1.

Cylinder 11 is mounted on plate 10 and contains pistons 12 connected with links or connecting rods 13 which are pivoted at 14 to the upper ends of brake shoe 8. Pistons 12 are moveable in cylinder 11 for action on shoe 8 by pressing fluid such as oil within the cylinder, the pressure of which is under the control of the operator.

Brake shoe 8 is anchored at its lower portion to back plate 10 by means of link 15 which is pivoted to the shoe at 16 and to the back plate at 17. Pin 17 may be regarded as a pivot anchor for link 15. Brake shoe 8 is constructed of one piece and is made of springy material, two sections of mild steel 18 are inserted and fastened to shoe 8 both to stiffen it and to serve a purpose which is later discussed. These sections 18 cover about one-third of the diameter on both sides. Elements 18 are provided with a projecting central portion 50 from which depends tongue or angle 51. This angle 51 is cut away at the ends of stiffeners 18 so as to provide for pivots 14 and 16.

Figure 2:
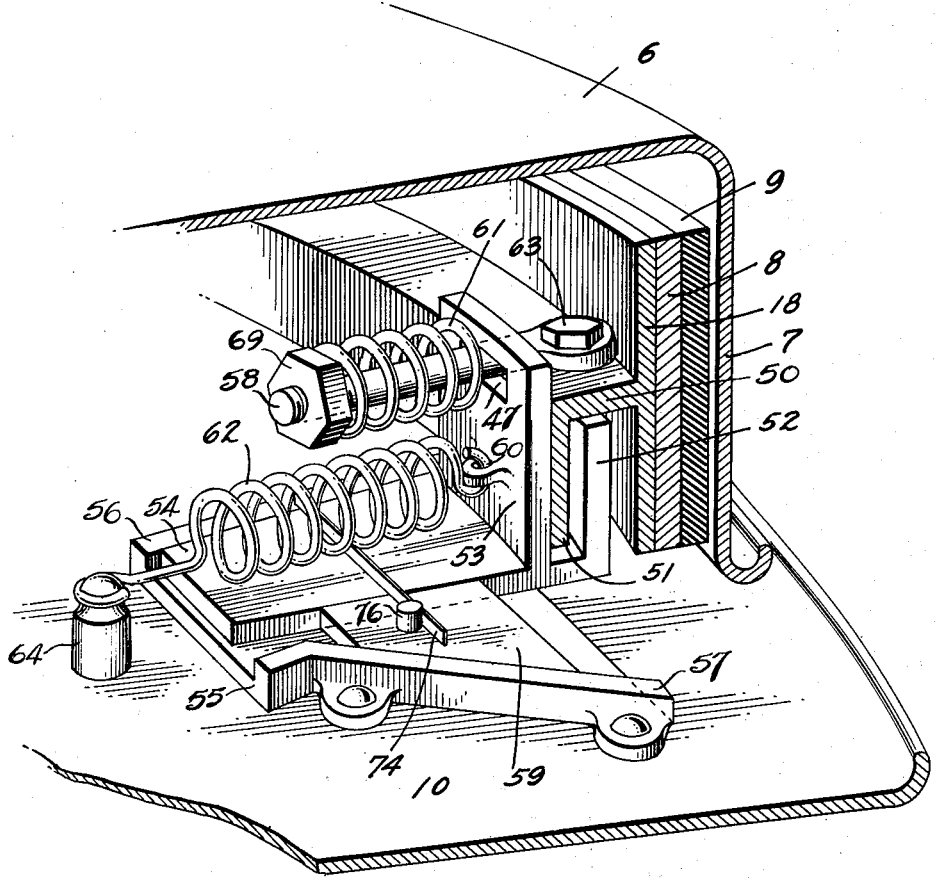
Fig. 2 is a fragmentary perspective view of one of the four adjusting means shown in Fig. 1.

The single shoe is positioned, in the device chosen to illustrate the invention, by four adjusters which are possibly best shown in detail in Fig. 2. The adjusters consist of a wedge shaped piece 54 which slides within another wedge shaped bearing plate 55 provided with upstanding flanges 56 and 57. Piece 54 is intended to ride against flange 56. Element 54 is provided at one end with upstanding spaced tongues 52 and 53. Tongue 52 is at one end of element 54 and fits between depending angle 51 and the back portion of element 18. Tongue 53 is spaced inwardly from tongue 52 a distance greater than the thickness of depending angle 51. Tongue 53 is higher than tongue 52 and is provided at its upper end with an aperture 47 through which projects eye bolt 58 which is anchored in portion 50 of stiffeners 18 by means of screw 63.

Coil spring 61 surrounds the shank of eye bolt 58 and bears against the inner surface of tongue 53 against which it is pressed by nut 69 threaded to one end of bolt 58. Washers may be provided as bearing surfaces for each end of spring 61. Spring 61 is kept under compression and urges stiffeners 18, depending angle 51 and brake shoe 8 toward tongue 53. On the lower portion of the inner surface of tongue 53 is provided an anchor means 60 for spring 62. At its other end spring 62 is anchored to backing plate 10 by pin 64. Spring 62 is a tension spring and urges wedged plate 54 away from brake drum 7. As has been mentioned, wedge shaped piece 54 is wider on its outer end on which tongues 52 and 53 are located than at its inner end. A wedge 59 bears upon one side of wedge shaped piece 54 and also against flange 57 of element 55. Element 55 is anchored to back plate 10 by any suitable means. Wedge 59 is provided with an upstanding pin 76 upon which bears leaf spring 74. Leaf spring 74 is anchored in means 75 on one side of element 55 and tends to urge wedge 59 inwardly away from drum 7. There is sufficient clearance between wedge shaped piece 54 and coil spring 62 so that leaf spring 74 may function without interference. Cylinder 11 is connected by means of tube 65 with cylinder 66 in which is located plunger 67. Cylinder 66 communicates with an oil reservoir 68 by means of a small aperture 77. Plunger 67 is connected with brake pedal 71 by means of connecting rod 70. Brake pedal 71 is maintained in a retracted position by spring 72 and stop 73.

The operation of the device is substantially as follows.

When it is desired to apply the brakes, pedal 71 is depressed by the operator's foot or other means which causes piston 67 to move in cylinder 66. Reservoir 68 insures that cylinder 66 is at all times filled with oil since the oil can flow from the reservoir into the cylinder through aperture 77. Aperture 77 is positioned at the upper part of the oil system so as to insure that there is no entrapped air to interfere with the operation. As soon as plunger 67 moves past aperture 77 it begins to build up shbstantial pressure in cylinder 66 which is transmitted through tube 65 to cylinder 11 and there communicated to pistons 12 which are caused to separate and thus through links 13 and pivot 14 expand brake shoe 8, causing lining 9 to grip the inner surface of drum 7.

As brake 8 is expanded under the action of pistons 12, stiffeners 18 and bolts 58 are carried with it and spring 61 is compressed. Upon release of the pedal spring 61, shoe 8 is retracted away from drum 9 until angle 51 meets tongue 53. This release movement of the shoe is limited to the distance between tongues 52 and 53 minus the thickness of angle 51.

At the moment of effective braking, angle 51 and tongue 52 are always in contact. As lining 9 wears under braking action the shoe 8 moves toward drum 7 due to the braking force upon it and pulls wedge member 54 forward with it by means of the engagement of angle 51 and tongue 52. Wedge member 54 slides on bearing plate 55 being confined on one side by flange 56. Wedge 59 bears on the opposite side of wedge member 54 and also against flange 57 of plate 55 on which it likewise slides. Wedge 59 cooperates with wedge member 54 and together they lock each other against movement toward the smaller end of bearing plate 55 because of the action of flanges 56 and 57. Wedge 59 is continually urged toward the smaller end of plate 55 under the action of leaf spring 74 on pin 76. Thus as member 54 is pulled out by brake 8 wedge 59 moves in and prevents the return of member 54. The space between tongues 52 and 53 is just enough for proper clearance between drum 7 and lining 9 so that there is not even an initial period of wearing down of lining 9 prior to adjustment and the adjustment is made exactly as needed.

It will be seen that movement of the shoe is always the same, e. g. the space between tongues plus the small wear of each individual brake application which is adjusted for as it takes place because of the action of angle 51 on member 54. It follows that the pedal positions are always the same for a given brake application and the pistons always have the same travel.

The adjuster shown in Fig. 2 is generally applicable to brakes and is not confined to hydraulic brakes.

The one piece shoe 8 is of springy material and tends to close upon itself thus normally placing some force on pistons 12 and assisting spring 61 upon release. Such a shoe would be self-energizing when applied during forward or counterclockwise rotation of wheel 6. This effect may be increased by moving pivot 17 nearer the center of rotation.

Where greater flexibility of the brake shoe is desired, stiffener 18 may be relieved between adjusters. This is readily accomplished by removing a portion of the material at these points. The amount of flexibility may be determined by the amount of material removed as well as by the character of the shoe itself.

I claim:

1. In a vehicular brake, a drum, a brake shoe mounted on a floating pivot and adapted to bear on said drum, projecting means on said shoe, adjusting means comprising a wedge member having spaced walls cooperating with the projecting means on said shoe and adapted to receive said projection between said walls, said walls being spaced a distance apart to provide a running clearance for the brake shoe, resilient means urging said wedge member and said shoe toward each other, resilient means urging said wedge member away from said drum and a locking wedge means adapted to prevent movement of said wedge member away from said drum.

2. In a vehicular brake, a drum, a brake shoe mounted on a floating pivot adapted to bear on said drum, adjusting means comprising a sliding member, means on said shoe and means on said sliding member in cooperative engagement, means urging said sliding member and said shoe toward each other, means urging said sliding member away from said drum, said cooperating means on said sliding member and said shoe being so constructed that they determine the clearance between the shoe and the drum upon the release of said brake, said means in cooperative engagement being so arranged as to provide a running clearance to allow for the release of said shoe and to move said sliding member toward said drum as movement of said shoe in excess of said running clearance is required for adequate braking, and means to prevent movement of said sliding member away from said drum.

3. In combination, a brake shoe mounted on a floating pivot, adjusting means associated with said shoe, said means comprising a wedge shaped member, means locking said wedge member upon release of said shoe, a broad base supporting element upon which said wedge member slides, guide means thereon constraining the movement of said wedge member, an upstanding projection on said wedge shaped member, said projection cooperating with means on said shoe whereby the shoe is kept in adjustment.

4. In combination, a brake shoe mounted on a floating pivot, a drum, adjusting means associated with said shoe, said adjusting means being relatively freely movable toward said drum, wedge means acting on one side of said adjusting means and exerting sufficent force to lock it against any adjusting means as the latter moves toward said drum, spaced projecting tongues allowing running clearance on said adjusting means, a projection on said shoe cooperating with said tongues whereby a spaced relationship between the shoe and the adjusting means is maintained.

5. In a vehicular brake, a drum, a back plate, a brake shoe mounted on a floating pivot adapted to bear on said drum, adjusting means comprising movable means mounted on said back plate and readily movable toward said drum, means to prevent the return movement of said movable means away from said drum, means on said brake shoe cooperating with said movable means with sufficient play to provide adequate clearance between said shoe and said drum whereby as the brake is applied and said shoe moved toward said drum the clearance is taken up and when adequate braking makes it necessary that the shoe move a greater distance than is required to take up the clearance the means on said shoe causes the movable means to move as a unit with the shoe toward the drum and upon release of the brake the shoe moves away from the drum a distance determined by the clearance where it is stopped by the movable member which cannot move away from said drum.

6. In a vehicular brake, a drum, a back plate, a brake shoe mounted on a floating pivot adapted to bear on said drum, adjusting means comprising wedge-shaped slidable means mounted on said back plate and readily movable toward said drum, means to prevent the return movement of said wedge-shaped means, means on said brake shoe engaging with said wedge shaped means with sufficient play to provide adequate clearance between said shoe and said drum whereby as the brake is applied and said shoe moved toward said drum the clearance is taken up and when adequate braking requires that the shoe move a greater distance than is necessary to take up the play in engagement of the wedge-shaped means and the means on said shoe the wedge-shaped means is moved toward the drum and upon release of the brake the shoe moves away from said drum a distance proportional to the clearance where it is stopped by the wedge-shaped member which is prevented from moving away from said drum.

7. In a vehicle brake, a drum, a brake shoe mounted on a floating pivot and adapted to bear on said drum, a plurality of adjusting means each comprising a wedge member having a lost motion connection with said shoe, said lost motion mechanism allowing for running clearance for said shoe and adapted to advance said wedge member toward said drum as movement of said shoe in excess of said clearance is required to obtain adequate braking, means to prevent return movement of said wedge member, resilient means urging said wedge member away from said drum, said shoe being substantially circular and long enough to contact well over 180° of arc of the surface of said drums, said plurality of adjusting means being spaced around the shoe so as to give an optimum effect of adjustment.

8. In combination, a brake shoe mounted on a floating pivot, a drum, wedge adjusting means associated with said shoe, said adjusting means being relatively freely movable toward said drum, wedging stop means acting on said adjusting means and exerting sufficient force to lock it against movement away from said drum, lost motion means associated with said adjusting means and said shoe comprising spaced walls allowing running clearance between said shoe and said drum and cooperating means extending between said walls whereby the shoe and drum are maintained in adjusted relation.

9. In combination, a frame having two guide means thereon, said guide means being convergent, wedge means movably positioned on said frame and bearing on a guide means, a wedging means movably positioned on said frame and bearing on a guide means and on said wedge means, the narrower portion of said wedge means being disposed in the general direction of the point of convergence of the guide means, means urging said wedging means toward the point of convergence of said guide means, lost motion means providing a clearance and associated with said wedge means whereby said wedge means may be moved away from the point of convergence of the guide means by small increments and held firmly against motion toward said point of convergence.

EDWARD J. NACHTWEY.